April 29, 1941.   R. BINDER   2,240,127

FRICTION COUPLING

Filed April 15, 1938

INVENTOR
*Richard Binder*
BY
ATTORNEYS

Patented Apr. 29, 1941

2,240,127

UNITED STATES PATENT OFFICE 2,240,127

FRICTION COUPLING

Richard Binder, Schweinfurt, Germany

Application April 15, 1938, Serial No. 202,213
In Germany May 5, 1937

3 Claims. (Cl. 192—103)

The present invention relates to friction couplings, provided with disc-like coupling members one of which consists of one or more discs having a lining or covering of friction material, whereas the other consists of a casing in which a movable pressing disc rotating with the casing is arranged. The two coupling members are, in a well known manner, pressed together by releasable springs and levers which under the action of the centrifugal force exert an additional coupling pressure upon both members.

The friction coupling according to the invention differs from known devices of this kind by the fact, that the harmful effect of the resiliency of the casing is, in a suitable manner, removed or rendered useful for pressing together the coupling members.

In most friction couplings in which centrifugal weights serve for producing the total pressing force or a portion of same, an alteration of the length of adjustment of the coupling due to the resiliency of the casing and other parts also which are subjected to this pressing force is caused by the increase of pressure occurring with increasing speed of revolution. This alteration sometimes is such as to consume the safety clearance available between the thrust bearing and the coupling levers, so that slipping of the coupling and thereby an increased wear of the covering or lining of the coupling members as well as of the throw-out bearing results.

According to the present invention this alteration is partially or totally removed by arranging counter-weights at the casing of the coupling in such a manner, that the centrifugal forces due to these weights counter-act a deformation of the casing.

In the accompanying drawing two constructions of couplings according to the invention are shown by way of example.

Figure 1:
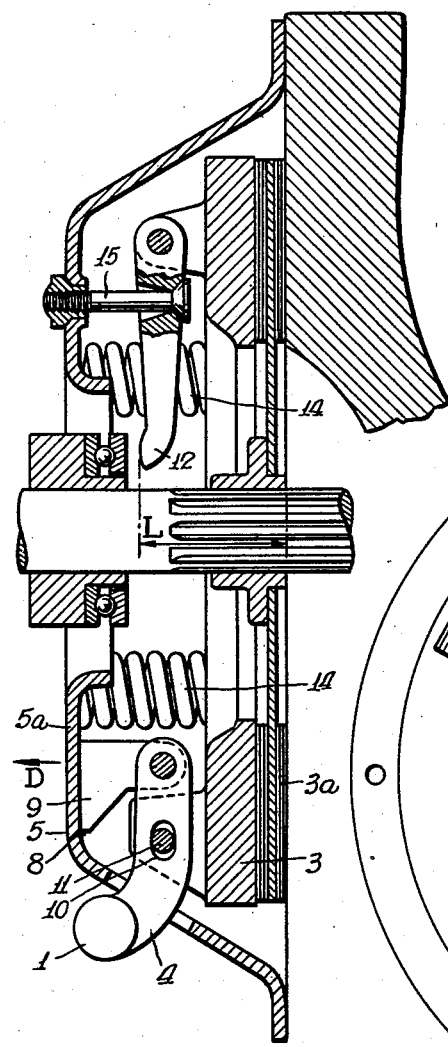
Fig. 1 shows an axial section through a coupling according to the invention.
Figure 2:
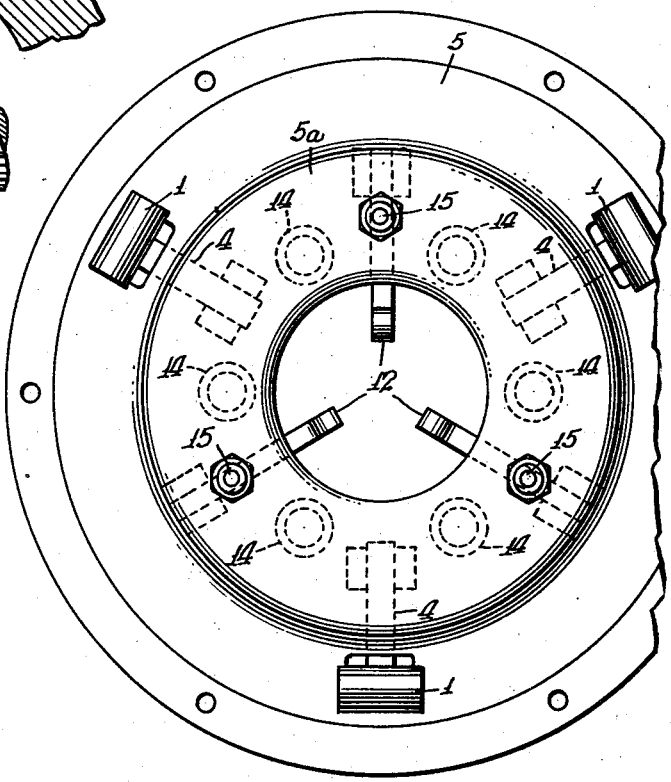
Fig. 2 is a fragmentary end view of the coupling, with part of the disengaging shaft mechanism removed.

In the specific construction shown, the friction coupling comprises two coupling members, one of which comprises a casing 5 including a casing wall 5a secured to the fly wheel, and enclosing an axially movable pressure disc 3. The other coupling member is the usual clutch disc mounted on a shaft for rotation therewith and positioned between said fly wheel and said pressure disc. Suitable friction facing material 3a is disposed on opposite sides of the clutch disc. The pressure disc 3 and the fly wheel are urged into coupling engagement with opposite surfaces of the clutch disc by springs 14.

In order to disengage the coupling, shifter levers 12 are provided, pivotally connected to the disc 3, and having fulcrum connections to one end of the rods 15 respectively, the other ends of said rods being anchored to the wall 5a of the coupling member 5.

Centrifugal weights 1 are provided for the purpose of increasing the surface coupling pressure between the members 3 and 5 and the clutch disc with increasing speed of rotation. These weights 1 are connected to the radially outer ends of levers 4 respectively. Each of these levers 4 is pivotally connected to a small block 9, fixed to the inner side of the casing wall 5a, and transmits pressure upon the pressing disc 3 by means of a pin or bolt 11 movably arranged in the longitudinal slot 10 of said lever. As the coupling is rotated, each centrifugal weight 1 is rotated counter-clockwise (Fig. 1) about its pivotal support on the block 9 by centrifugal action, to urge the two members 3 and 5 into firmer coupling engagement with the intervening clutch disc, and as the speed of rotation increases the coupling force resulting from the action of the centrifugal weights 1 is increased. At the same time, the lever 4 exerting a pressure in the direction of the arrow D through the block 9 and to the casing 5 deforms the end wall 5a of said casing, and thereby tends to cause an increase in the distance or setting length L.

The centrifugal weights 1 with their respective levers 4 and the blocks 9 act as counter-weights, and due to centrifugal force acting upon these members produce a moment about the point 8. This moment exerts a force upon the casing 5 in a direction opposite to that of the arrow D, and counter-balances the forces acting upon the end wall 5a of the casing 5 in the direction D, so that harmful deformation of said casing is prevented.

What I claim is:

1. In a friction coupling of the class wherein there is provided a pair of coupling elements, one of which includes a casing having a portion substantially perpendicular to the axis of the coupling, and springs for moving said elements into surface coupling relationship, the combination therewith of pivotally supported centrifugal weights operable by centrifugal force to increase the surface coupling pressure between said elements, and exerting outward axial forces on said casing section tending to outwardly deform said casing, and change the setting length of said coupling, and means for creating forces having components acting in opposition to said axial forces, to prevent harmful deformation of said casing and prevent substantial changes in said setting length, and including weights pivotally suspended from the inner side of said casing, and acting by centrifugal force to produce said component forces against said casing.

2. In a friction coupling of the class wherein there is provided a pair of coupling elements, one of which includes a casing having a section substantially perpendicular to the axis of the coupling, and springs for moving said elements into surface coupling relationship, in combination therewith of centrifugal weights operable by centrifugal force to increase the surface coupling pressure between said elements, but exerting at the same time axial forces on said casing section tending to deform said casing and change the setting length of said coupling, and means including said centrifugal weights, and acting under centrifugal action for creating forces having components acting in opposition to said axial forces, to prevent harmful deformation of said casing, and prevent substantial changes in said setting length.

3. In a friction coupling of the class wherein there is provided a pair of coupling elements, one of which includes a casing having a section substantially perpendicular to the axis of the casing, and springs for moving said elements in surface coupling relationship, in combination therewith of centrifugal weights pivotally suspended from the inner sides of said casing section, and having slot and pin connections with the other element, said slots extending substantially in radial directions, whereby said weights serve to increase the surface coupling pressure between said elements, and at the same time prevent harmful deformation of said casing resulting from axial forces thereon.

RICHARD BINDER.